Nov. 4, 1952  R. G. SCHLAWIN  2,617,092
DIFFERENTIAL SCREW ADJUSTMENT FOR MAGNETIC CORE AIR GAPS
Filed Sept. 8, 1949

Inventor:
Ralph G. Schlawin
by Ernest C. Britton
His Attorney.

Patented Nov. 4, 1952

2,617,092

UNITED STATES PATENT OFFICE 2,617,092

DIFFERENTIAL SCREW ADJUSTMENT FOR MAGNETIC CORE AIR GAPS

Ralph G. Schlawin, Pittsfield, Mass., assignor to General Electric Company, a corporation of New York Application September 8, 1949, Serial No. 114,471

3 Claims. (Cl. 336—20)

My invention relates to stationary electrical induction apparatus, and more particularly to magnetic cores of the type having adjustable air gaps.

In the construction of some types of electrical reactors, it is common practice to provide the magnetic core of the reactor with an air gap, in order to obtain certain desired magnetic characteristics. Where the reactance value of the reactor must be held within a predetermined close tolerance, this value is very often obtained by adjustment of the air gap in the magnetic core. This adjustment is normally made by the addition of spacer members until the thickness of the air gap has been changed sufficiently to give the desired value of reactance. However, due to the fact that the change in thickness of the air gap which is involved is generally of the magnitude of several thousandths of an inch, considerable difficulty is sometimes experienced in machining spacers of the requisite dimensions.

It is an object of my invention to provide a device integral with the reactor structure for varying the thickness of the reactor air gap within very close tolerances.

It is a further object of my invention to eliminate the necessity for using spacers in order to adjust the air gap of a magnetic reactor.

In accomplishment of these objectives, my invention provides a device integral with a magnetic core which provides for adjustment of the air gap within close tolerances by means of a differential motion between a threaded stud attached to one part of the magnetic core, and an externally threaded screw having a tapped and threaded axial hole within which the stud moves. This screw has threads of different pitches on its external and internal surfaces. Motion of the screw with respect to the reactor casing on its external thread causes an opposite motion of the threaded stud along the drilled and threaded axis of the screw. The stud and screw move in opposite directions, with the net change in the air gap being the difference between these two motions.

Figure 3:
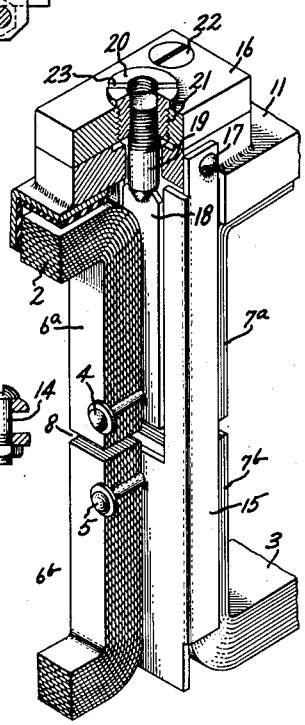

The features of this invention which I believe to be novel are set forth with particularity in the appended claims. My invention itself, however, both as to its organization and use, together with further objects and advantages thereof, may best be understood by reference to the following description taken in connection with the accompanying drawing in which Figs. 1 and 2 represent respectively a top plan view and a front elevation view of a magnetic core embodying the air gap adjusting means of my invention; while Fig. 3 represents a perspective view partially cut away, of a section of the magnetic core containing the embodiment of my invention.

Figure 1:
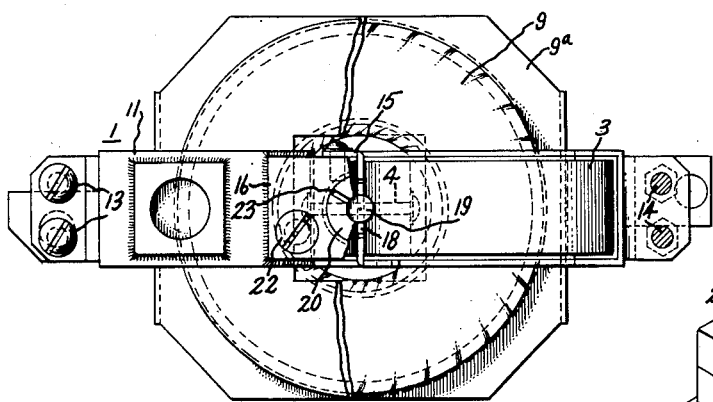
Figure 2:
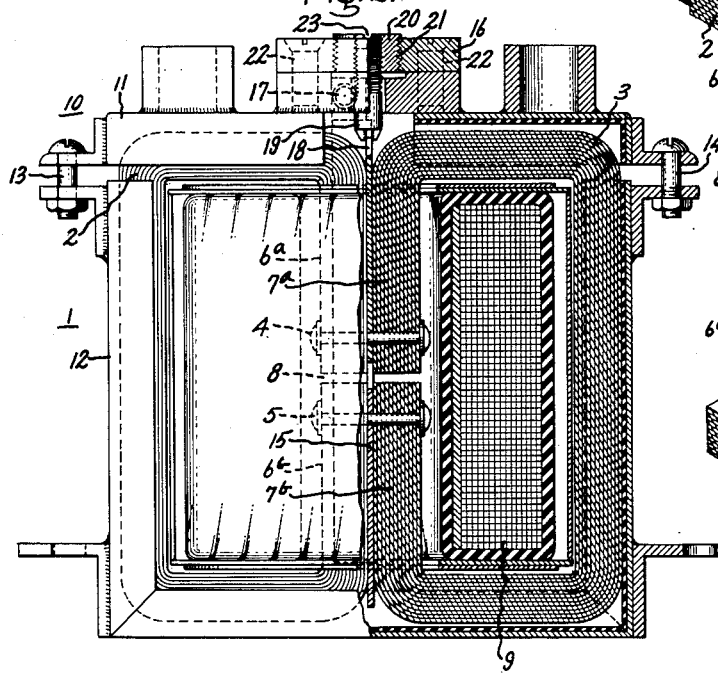

Referring now to Figs. 1 and 2, there is shown therein a reactor 1 comprising a laminated magnetic core having two approximately rectangular core sections 2 and 3 which are held together to form a unitary magnetic structure by means of bolts or rivets 4 and 5. Core sections 2 and 3 are each respectively formed by bending a plurality of strips of magnetic material or by spirally winding a single strip of magnetic material about a suitable mandrel of rectangular shape. One leg of each of the respective core sections is slotted at approximately its midpoint to provide an air gap.

The two rectangular core sections 2 and 3 have their respective slotted legs adjacent to one another, being separated only by an interposed brace or tie-plate member to be hereinafter described. That is, leg sections 6a, 6b of core section 2 are respectively adjacent leg sections 7a, 7b of core section 3. These adjacent leg sections 6a, 6b, 7a, 7b together constitute the center leg of the reactor. Adjacent leg sections 6a, 7a are separated from adjacent leg sections 6b, 7b by air gap 8. A cylindrical winding 9 is placed about this center leg. Suitable supporting means 9a is provided adjacent the upper and lower surfaces of winding 9.

A metal encasing and clamping means 10 is provided for the magnetic core and is comprised of an upper section 11 and a lower section 12. These two sections are relatively movable with respect to one another, and may be clamped together by bolts 13 and 14, thereby compressing the laminated magnetic core inside of the clamping and encasing means 10.

In accordance with my invention, the thickness of the air gap 8 is varied by moving the two sections of the center leg on opposite sides of the air gap with respect to one another by a device which is integral with the core and clamp structure, as will be hereinafter described. In the construction illustrated in the drawing, the lower half of the center leg comprised of sections 6b, 7b below the air gap 8 is stationary with respect to the clamping structure 10, while the upper half 6a, 7a of the center core leg is movable with respect to the clamping structure 10. This relative motion between the upper section 6a, 7a and the lower section 6b, 7b of the center core leg permits a variation of the air gap.

The lower half 6b, 7b of the center core leg below the air gap is rigidly attached by means of a tie-plate or brace member 15 to a block 16 which is rigidly mounted in the center of the top surface of upper clamping member 11. Tie-plate or brace member 15 is of S-shape and is positioned in the center of the center core leg between the adjacent surfaces of core sections 2 and 3. Rivet 5, which, as has been previously mentioned, holds legs 6b, 7b of core elements 2 and 3 together to form the lower portion of the center leg, also passes through tie-plate 15 which is interposed between the adjacent surfaces of leg sections 6b, 7b. The two outer edges of tie-plate 15 are respectively bent in oppositely-disposed right angles to its center portion, thereby giving member 15 its S configuration, and also providing a suitable surface through which screws 17 can pass in order to rigidly attach tie-plate 15 to block 16 on the upper surface of clamping member 11.

As can best be seen in Fig. 3, slightly more than the upper half of the interposed surface of tieplate 15 between center leg sections 6a, 7a, is cut away in order to permit the interposition of rectangular steel strip 18 which is rigidly fastened at its lower end to the lower end of leg members 6a, 7a by means of rivet 4, which also serves to hold leg members 6a, 7a rigidly together.

In accordance with my invention, the upper portion of steel strip 18 is fastened rigidly by some suitable method, such as welding, for example, to the lower end of stud 19. The upper portion of stud 19 is threaded externally and is in engagement with the internal threads of axially drilled and threaded screw 20. The screw 20 has a hole drilled through its center axis, and this hole is threaded with a thread of the same pitch as that on the outer external surface of stud 19, so that stud 19 and the threaded axial drilled hole of screw 20 are in threaded engagement. The outer surface of screw 20 is also threaded, but has a thread of a different pitch than that of the threaded hole through its center axis. This external thread of a different pitch than that of the threadternal thread drilled hole 21 in block 16. To facilitate assembly operations, block 16 is split into an upper and a lower section, with the upper section being threaded to receive screw 20. The two sections of block 16 are held together by screws 22.

In adjusting the air gap 8, screw 20 is turned by means of slot 23 in its upper surface. When screw 20 is turned in a clockwise direction, for example, and assuming that all threads are righthand threads, the clockwise motion of screw 20 causes it to move downward to the extent of one thread pitch, and if this were all that were involved, the upper section 6a, 7a of the center core leg would move downwardly a corresponding amount since the stud 19 axially positioned in screw 20 is connected to center leg section 6a, 7a by means of steel strip 18. However, as has been mentioned before, threaded stud 19 is in engagement with the axially drilled threaded hole in screw 20. Consequently, a downward motion of screw 20 will cause an upward motion of threaded stud 18, to the extent of one thread pitch. However, the thread pitch of the stud 18 is a different value than that of the outer threaded surface of screw 20. Consequently, there will be a differential between these two opposing motions, so that the net motion will be the difference between the two thread pitches.

Using concrete values for illustrative purposes, assume that the outer surface of screw 20 has ten threads per inch, and that the threaded stud has eighteen threads per inch. Then, it can be seen that a clockwise movement of screw 20 of one turn will cause it to have downward motion of one-tenth of an inch. At the same time, however, the threaded stud will move upwardly one-eighteenth of an inch. The net motion of the stud 19, the steel strip 18, and the upper portion 6a, 6b of the center leg of the magnetic core, will be $\frac{1}{10}$ inch $- \frac{1}{18}$ inch $= .0444$ inch downward. The reverse is true when the slotted screw is turned in the opposite direction.

It can be seen, therefore, that my invention provides an easy and convenient means for adjusting the air gap of a magnetic core. It permits adjustment within very narrow tolerances, and in very small increments, due to the differential motion between the screw 20 and the stud 19, as as hereinbefore described. This permits adjustment of the reactance values within very close limits, by adjustment of the air gap using the device which I have disclosed.

While there has been shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a magnetic core comprising two generally rectangular-shaped magnetic hollow core sections formed of bent strip magnetic material, each of said sections having one leg thereof adjacent one leg of the other section to form a composite center winding leg about which an electrical winding is placed, an encasing means surrounding said magnetic core, an air gap intermediate of the length of said center winding leg, means for adjusting the thickness of said air gap comprising a metallic strip having one end attached to one section of said center leg on one side of said air gap, said metallic strip being positioned intermediate the adjacent legs of said core sections, a stud rigidly attached to the other end of said metallic strip, an externally threaded screw rotatable in said casing, said screw also being axially drilled and threaded, the axial threads and external threads of said screw being of different pitch, said stud being threaded at one end and engageable with the axial threads of said screw, rotation of said screw on its external threads to cause axial advancement of said screw in one direction causing axial motion of said stud in an opposite direction, thereby causing a motion of said section of said center leg attached to said metallic strip equal to the differential motion between said screw and said stud.

2. In a laminated magnetic core comprising two magnetic core sections of substantially hollow rectangular shape and formed of bent strip magnetic material, said core sections each having one leg adjacent one leg of the other core section to thereby form a center winding leg about which an electrical winding may be placed, said center winding leg being provided with an air gap intermediate of its length, means for adjusting the thickness of said air gap comprising a casing enclosing said magnetic core, an externally threaded screw threadedly movable in said casing, said screw also being drilled and threaded axially, the external and internal threads of said screw being of different pitch, a threaded stud movable along the threaded drilled axis of said screw, a metal strip having one end rigidly attached to an end of said stud, the other end of said metal strip being rigidly attached to said core side on one side only of said air gap, said metal strip being interposed between said adjacent legs of said two core sections, axial movement of said screw along its external thread with respect to said casing causing motion in an opposite axial direction of said threaded stud, the motion of said stud being communicated through said metal strip to said core side on one side of said air gap, the resultant change in said air gap being a function of the difference between the external and internal thread pitches of said screw.

3. In a magnetic core of the bent strip type having two laminated magnetic core sections of generally rectangular shape, with one leg of each of said rectangular core sections adjacent one leg of said other core section, said two adjacent legs together forming a composite leg about which an electrical winding is placed, an air gap intermediate of the longitudinal dimension of said composite leg, means for adjusting the thickness of said air gap comprising a metallic strip having one end rigidly attached to one section of said composite leg on one side of said air gap, said metallic strip being interposed between said adjacent legs of said core sections, a stud rigidly attached to the other end of said metallic strip, a casing surrounding said magnetic core, an externally threaded screw rotatable in said casing, said screw being axially drilled and threaded, the axial threads and external threads of said screw being of a different pitch, said stud being threaded at one end and engageable with the axial threads of said screw, rotation of said screw to cause axial advancement of said screw in one direction causing axial motion of said stud in an opposite direction, thereby causing a motion of said section of said composite leg attached to said metallic strip equal to the differential motion between said screw and said stud, the section of said composite leg on the opposite side of the air gap to the point of attachment of said metallic strip being rigidly braced in a stationary position with respect to said casing, with means for bracing said last-mentioned section of said composite leg comprising a generally S-shaped brace member which is rigidly attached to said last-mentioned section of said composite leg and is also rigidly attached to said casing, said S-shaped brace member having a main body portion lying between said adjacent core legs and extending for substantially the entire length of said legs in a plane substantially parallel to the plane thereof, said main body portion of said brace member being apertured adjacent said section of said composite leg to which said strip member is attached to receive said strip member, the two oppositely disposed longitudinally-extending edges of said brace member being bent in opposite directions substantially perpendicularly to the main body portion of said brace member, said respective longitudinally-extending edges each embracing the edge of a different one of said two adjacent legs.

RALPH G. SCHLAWIN.

REFERENCES CITED

The following references are of record in the file of this patent:

UNITED STATES PATENTS

| Number | Name | Date |
| --- | --- | --- |
| 2,236,292 | Kirk | Mar. 25, 1941 |
| 2,338,271 | Ulanet | Jan. 4, 1944 |
| 2,446,624 | Allison | Aug. 8, 1948 |
| 2,482,471 | Dowell | Sept. 20, 1949 |